(12) United States Patent
Cron et al.

(10) Patent No.: US 10,245,789 B2
(45) Date of Patent: Apr. 2, 2019

(54) HYBRID COMPONENT PART COMPRISING A LOCAL STIFFENING COMPOSED OF A TWO-STAGE-CROSSLINKED POLYURETHANE-BASED FIBRE COMPOSITE MATERIAL

(71) Applicant: Evonik Degussa GmbH, Essen (DE)

(72) Inventors: Christina Cron, Velbert (DE); Marina-Elena Schmidt, Gelsenkirchen (DE); Tobias Gutmann, Dorsten (DE); Uwe Stapperfenne, Wülfrath (DE); Sandra Reemers, Münster (DE); Leif Ickert, Düsseldorf (DE)

(73) Assignee: Evonik Degussa GmbH, Essen (DE)

( * ) Notice: Subject to any disclaimer, the term of this patent is extended or adjusted under 35 U.S.C. 154(b) by 32 days.

(21) Appl. No.: 15/255,247

(22) Filed: Sep. 2, 2016

(65) Prior Publication Data

US 2017/0066179 A1 Mar. 9, 2017

(30) Foreign Application Priority Data

Sep. 3, 2015 (EP) .................................... 15183660

(51) Int. Cl.
| | | |
|---|---|---|
| *B29C 65/00* | (2006.01) | |
| *B29C 65/02* | (2006.01) | |
| *B29C 70/86* | (2006.01) | |
| *B29C 35/02* | (2006.01) | |
| *C08J 5/24* | (2006.01) | |
| *C08G 18/79* | (2006.01) | |
| *C08G 59/42* | (2006.01) | |
| *C08G 18/42* | (2006.01) | |
| *C08L 75/04* | (2006.01) | |
| *B29C 65/48* | (2006.01) | |
| *C08G 59/40* | (2006.01) | |
| *B29L 31/00* | (2006.01) | |
| *B29K 105/24* | (2006.01) | |

(52) U.S. Cl.
CPC .............. *B29C 65/02* (2013.01); *B29C 35/02* (2013.01); *B29C 65/48* (2013.01); *B29C 70/86* (2013.01); *C08G 18/42* (2013.01); *C08G 18/798* (2013.01); *C08G 59/4028* (2013.01); *C08G 59/42* (2013.01); *C08J 5/24* (2013.01); *C08L 75/04* (2013.01); *B29C 2791/001* (2013.01); *B29K 2105/243* (2013.01); *B29L 2031/731* (2013.01); *C08J 2375/06* (2013.01)

(58) Field of Classification Search
CPC ......... B29C 65/02; B29C 35/02; B29C 65/48; B29C 70/86; C08L 75/04; C08L 5/24; C08G 18/798
See application file for complete search history.

(56) References Cited

U.S. PATENT DOCUMENTS

| | | |
|---|---|---|
| 4,476,054 A | 10/1984 | Disteldorf et al. |
| 4,912,210 A | 3/1990 | Disteldorf et al. |
| 4,929,724 A | 5/1990 | Engbert et al. |
| 5,329,003 A | 7/1994 | Bruchmann |
| 8,455,090 B2 | 6/2013 | Schmidt et al. |
| 2013/0106138 A1 | 5/2013 | Brockhoff et al. |
| 2013/0108878 A1 | 5/2013 | Kleine et al. |
| 2013/0230716 A1 | 9/2013 | Schmidt et al. |
| 2013/0231017 A1 | 9/2013 | Schmidt et al. |
| 2013/0323993 A1 | 12/2013 | Schmidt et al. |
| 2014/0087613 A1 | 3/2014 | Spyrou et al. |
| 2015/0174642 A1 | 6/2015 | Krammer et al. |
| 2015/0218375 A1 | 8/2015 | Hupka et al. |
| 2015/0321392 A1 | 11/2015 | Stapperfenne et al. |
| 2015/0321393 A1 | 11/2015 | Stapperfenne et al. |
| 2016/0023384 A1 | 1/2016 | Spyrou et al. |

FOREIGN PATENT DOCUMENTS

| | | |
|---|---|---|
| DE | 102011006163 | 9/2012 |
| DE | 102011076546 A1 | 11/2012 |
| EP | 0552370 | 7/1993 |
| EP | 0576393 | 12/1993 |
| EP | 15164444.0 A1 | 11/2015 |
| EP | 15164477.0 A1 | 11/2015 |
| JP | 2000254997 | 9/2000 |
| WO | 2016016069 | 3/2016 |
| WO | 2016037886 | 3/2016 |

OTHER PUBLICATIONS

Wicks, et al., Organic Coatings: Science and Technology, Wiley-Interscience, New York 1999, chap. 24.2.12, p. 459.
Granbom, "Structure and mechanical properties of dual phase steels", Doctoral thesis 2010, Royal Institute of Technology School of Industrial Engineering and Management SE-100 44 Stockholm, Sweden.
U.S. Appl. No. 13/824,084, filed Aug. 30, 2011, US 2013/0231022, Sep. 5, 2013.
U.S. Appl. No. 14/774,395, filed Sep. 10, 2015, US 2016/0023384, Jan. 12, 2016.

(Continued)

*Primary Examiner* — Michael L Leonard
(74) *Attorney, Agent, or Firm* — Michael Best & Friedrich LLP

(57) ABSTRACT

The invention relates to a hybrid component part comprising a local stiffening made of a two-stage-crosslinked polyurethane-based fiber composite material, more particularly to the production of such a hybrid component part. Said invention has for its object to specify a technology which makes it possible in cost-effective fashion to effect local stiffening of metal parts with a fiber composite material in order thus to obtain a hybrid component part. It is a fundamental concept of the process according to the present invention to use a particular polyurethane formulation which in a first crosslinking reaction can be converted into a thermoplastic polymer and later in a second crosslinking reaction is fully crosslinked to afford a thermoset matrix material. The thermoplastic polymer is characterized by a good adhesion to metal surfaces. The metal can be subjected to further forming with the attached thermoplastic material. The polyurethane is subsequently thermosettingly cured and achieves its final stiffness.

32 Claims, No Drawings

(56) References Cited

OTHER PUBLICATIONS

U.S. Appl. No. 14/705,485, filed May 6, 2015, US 2015/0321392, Nov. 12, 2015.
U.S. Appl. No. 14/705,563, filed May 6, 2015, US 2015/0321393, Nov. 12, 2015.
PCT/EP2015/069882, filed Sep. 1, 2015, WO 2016/037886, Mar. 17, 2016.
PCT/EP2015/066813, filed Jul. 23, 2015, WO 2016/016069, Feb. 4, 2016.
European Search Report for Application No. 16184318.0 dated Jan. 18, 2017 (7 pages).

HYBRID COMPONENT PART COMPRISING A LOCAL STIFFENING COMPOSED OF A TWO-STAGE-CROSSLINKED POLYURETHANE-BASED FIBRE COMPOSITE MATERIAL

CROSS-REFERENCE TO RELATED APPLICATION

This patent application claims the benefit of priority to European Application No. 15183660.8, filed on Sep. 3, 2015, the disclosure of which is incorporated by reference herein in its entirety, and priority to which is hereby claimed.

The invention relates to a hybrid component part comprising a local stiffening made of a two-stage-crosslinked polyurethane-based fibre composite material; more particularly the invention relates to the production of such a hybrid component part.

The term hybrid component part is to be understood as meaning a component part of a machine, of a land-, air-, space- or water-craft, of an installation, an apparatus or an appliance which is constructed from different, indissolubly interconnected materials. A hybrid component part essentially fulfills a mechanical function, usually as a load-bearing structural component part, but it may also be assigned further non-mechanical functions, such as electrical, thermal, acoustic or optical functions. To this end the employed materials are utilized not only mechanically but for example also for their optical and/or electrical properties.

A hybrid component part combines chemically very different materials in order to utilize the very different physical properties of these materials in synergistic fashion. The hybrid component part presented here is to a first approximation composed of two materials, namely a metallic material and a fibre composite material.

The metallic material is not a chemically pure metal but rather an alloy of a metal with further metals or nonmetals. Contemplated metallic materials are primarily steel but also aluminium alloys.

The fibre composite material in turn is a heterogeneous material which comprises a matrix composed of a thermoset polyurethane having fibres, for example carbon fibres, aramid fibres or glass fibres, embedded in it. The matrix and the fibres are indissolubly interconnected. The fibres are responsible for force transfer in the fibre composite material and the matrix transmits the external forces into the fibres and protects the fibres from damage. The matrix is also indissolubly connected to the metal. In this context the term "indissolubly" is to be understood as meaning that in normal use the matrix adheres to the metal immovably with respect thereto. If the fibre composite material becomes detached from the metal the hybrid component part is destroyed.

The hybrid component part is thus composed at least of the metallic material, of polyurethane and the fibre material.

An important aspect of the hybrid component part presented here is that the metal and the fibre composite material are not incorporated into the hybrid component part in equal parts but rather that a metallic main body determines the substantial geometric shape of the hybrid component part while the fibre composite material serves as a specifically arranged local stiffening of the main body. The underlying idea is to incorporate the greatest possible amount of inexpensive metal into the hybrid component part in thin wall thicknesses. Only at the points at which the metallic main body cannot withstand the mechanical stresses to be expected in normal use on account of its low wall thickness is the metallic main body selectively toughened with a high-strength fibre composite material. Lightweight construction is therefore employed in the hybrid component part to minimize both the weight and the material costs of the hybrid component part.

Since lightweight construction always depends on the subsequent stress condition the actual size of the stiffening as a function of the main body cannot be specified in general terms. The shape of the stiffening also depends on the stress; it may be punctiform like a knot or linear like a rib. What is decisive, however, is that compared to the metallic main body the fibre composite material encompasses only a localized region of the hybrid component part. As a result, the constructionally determinative shape of the hybrid component part—i.e. the outer dimensions and the fitting dimensions to adjacent component parts—is predefined by the geometry of the metallic main body.

In this respect the hybrid component part presented here is distinguished from sandwiches where one or more layers of sheet metal are combined with one or more layers of fibre composite material. This is because in the sandwich both the sheet-metal layers and the layers of fibre composite material occupy the same area as the entire sandwich so that localized stiffening of the sheet metals by the fibre composite material cannot take place. On the contrary, in such a sandwich the sheet metal is globally stiffened with fibre composite material.

Technically interesting areas of application of the hybrid component parts discussed herein may be found anywhere where low weight, high stiffness and low material costs are key. In addition the mechanical stresses to be expected in operation which act on the hybrid component part should be predictable with sufficient accuracy in order to be able to guarantee the safety of said component part. It would seem to be of particular interest to be able to offer such hybrid component parts in products that are produced on a large scale and where the consumers are particularly price sensitive.

Particularly relevant areas of application of the present hybrid component parts thus include constituents of automobile and other land craft bodies, for instance B-pillars, cross members, longitudinal members or floorpans. However, panels therefor which in conventional sheet metal construction do not belong to the load-bearing structural component parts, for instance bonnets, roofs or doors, may also be contemplated as hybrid component parts. Structural component parts of aeroplanes may also be implemented as hybrid component parts in the hereindescribed manner.

The hybrid component parts represented here are generally intended to substitute conventional purely metallic component parts. In many installation situations this is easier to achieve with a hybrid component part based on a metal material and having localized fibre reinforcement than with a metal-free fibre composite component part since force introduction into the fibres via the matrix is markedly more difficult to realize than in metal. In large-scale assembly metal-free fibre composite component parts can be joined to metallic component parts only in very costly fashion. By contrast in a metal-based hybrid component part, force introduction may preferentially be effected via the metal which may be joined to adjacent metallic component parts with proven technology (bolting, riveting, welding). The technologically demanding joining operation between the metal and the matrix is thus shifted from assembly to manufacture of the hybrid component part where it is better controllable.

Hybrid component parts comprising a metallic main body and a local stiffening composed of a fibre composite material are disclosed in US2013106138A1 and US2013108878A1. Both of these documents describe in rather conceptual terms a process where a metallic main body/a semifinished precursor thereof is provided with a reinforcement patch made of a prepreg (this is a pre-impregnated fibre/resin mixture) and also formed. However the chemistry of the resin which later forms the matrix is not described in any detail; the use of the term "resin" hints at an epoxide-based system. It is mentioned that attaching the prepreg to the metal requires an adhesive or modification of the resin with adhesion-promoting added substances.

It would be interesting from a manufacturing technology point of view to learn how well the "resin" employed therein adheres to the metal using the added substance or the adhesive, in particular when the metallic semifinished precursor with the adherent reinforcement patch is still to be subjected to forming. It is the experience of the applicant that commercially available prepregs made of epoxy resin achieve only a low level of adhesion on metal and it must therefore be assumed that the prepregs detach from the sheet metal again when this is subjected to forming before cross-linking of the epoxy resin. As a result the use of an additional adhesive or adhesion-promoting added substances seems unavoidable which complicates the placing of the uncrosslinked reinforcement patch on the metal part and thus adds cost. In the crosslinked state, forming of the sheet metal with the adherent reinforcement patch is no longer even conceivable since the epoxy resin then already exhibits thermoset properties and no longer has the ductility required for nondestructive forming.

Prepregs based on epoxy resins are moreover not generally storage stable at room temperature and therefore require costly and inconvenient cooling before processing in order that they do not crosslink at the incorrect time. The poor storage stability necessitates strict adherence to processing time windows which makes the production of hybrid component parts inflexible.

Storage-stable prepregs based on polyurethane are known in principle from U.S. Pat. No. 8,455,090B2 and from US2014087613A1. In a two-stage crosslinking procedure these prepregs are first precrosslinked to convert them into a thermoplastic state and then fully crosslinked to convert them into a thermoset state. They are storage stable at room temperature in the intervening time. However these prepregs are not intended for use in hybrid component parts and on account of their specific formulation do not have the required metal adhesion to remain at the intended location in the partially crosslinked state. The prepregs disclosed in U.S. Pat. No. 8,455,090B2 and US2014087613A1 are used in practice for producing fibre composite component parts having no appreciable metal content.

Patent applications EP15164444.0 and U.S. Ser. No. 14/705,485/EP 15164477.0 and U.S. Ser. No. 14/705,563 unpublished at the filing date of the present application disclose steel/aluminium- and polyurethane-based fibre composite component parts where initially from two layers of metal and one layer of fibres impregnated with thermoplastic matrix material a sandwich is formed which is then subjected to forming in its entirety and finally the thermoplast matrix material is fully crosslinked to afford a thermoset matrix material. A particular polyurethane formulation ensures that a good metal adhesion of the matrix material in the thermoplastic state is achieved and also retained upon forming of the metal part. As a result the obtained hybrid component parts are globally fibre-reinforced.

Yet another method for producing globally fibre-reinforced hybrid components—a so called organo sheet—is disclosed in DE102011076546A1. Prepregs employed within this publication are provided with a non-storage-stable polyurethane based matrix which behaves duroplastic after cross-linking. Alternatively, a thermoplastic matrix based on polyamide is used.

Having regard to this prior art the present invention has for its object to specify a technology which makes it possible to achieve local stiffening of metal parts with a fibre composite material in cost-effective fashion. The fibre composite material shall specifically be easy to handle, to store and to transport. Narrow processing time windows should be avoided to make production more flexible in terms of timing and location. The matrix material shall adhere well to the metal part without requiring application of additional adhesive. In particular it shall be possible to form the metal into another shape after attachment of the fibre composite material without the fibre composite material being destroyed or displaced. The matrix material shall additionally achieve the typical advantages of thermoset polymers over thermoplastic polymers in end use, namely higher mechanical strengths and stiffnesses, improved creep behaviour, enhanced chemical resistance and reduced water absorbance. Finally, an industrially practicable process for large-scale production of hybrid component parts comprising a metallic main body provided with a local stiffening made of thermoset fibre composite material shall be specified.

These objects are achieved by a process for producing a hybrid component part comprising the steps of:
a) providing a reactive composition at least comprising:
   at least one hardener which is a uretdione having an NCO functionality of at least two,
   at least one binder which is a polyol compound having an OH functionality of 3 to 6 and which comprises at least one polar functional group selected from an ester, carbonate, amide, urethane, urea, thioester or thiocarbonate functionality;
b) providing fibres;
c) coating the fibres with the reactive composition;
d) exposing at least the reactive composition to heat to perform a first crosslinking reaction in the course of which hardener and binder are converted into a thermoplastic polymer, thus embedding the fibres into the thermoplastic polymer;
e) providing a metallic main body or a semifinished precursor thereof;
f) placing the thermoplastic polymer comprising the fibres embedded therein onto a localized area of the main body/semifinished precursor thereof;
g) pressing the thermoplastic polymer onto the main body/semifinished precursor thereof so that the fibres adhere to the main body/semifinished precursor thereof via the thermoplastic polymer;
h) forming the semifinished precursor comprising the thermoplastic polymer adherent thereto to afford the metallic main body provided that only a semifinished precursor of the main body was provided in step e);
i) exposing at least the thermoplastic polymer to heat to perform a second crosslinking reaction in the course of which the thermoplastic polymer is converted to a thermoset polymer;
k) obtaining the hybrid component part comprising at least the metallic main body provided with at least one local stiffening composed of a fibre composite material, wherein the fibre composite material comprises a matrix formed from the thermoset polymer and the fibres embedded therein.

The invention thus provides such a production process. The invention likewise provides a hybrid component part produced in this way. Finally, the invention also provides for the use of the hybrid component part provided that in the context of lightweight construction during the use of the hybrid component part a local stress maximum acts at least intermittently in the region of the stiffening.

It is a fundamental concept of the process according to the present invention to use a particular polyurethane formulation which in a first crosslinking reaction can be converted into a thermoplastic polymer and later in a second crosslinking reaction is fully crosslinked to afford a thermoset matrix material. The thermoplastic polymer is characterized by a good adhesion to metal surfaces. The metal can even be subjected to further forming with the attached thermoplastic material. The polyurethane is subsequently thermosettingly cured and achieves its final stiffness.

Thus in accordance with the invention the thermal curing to afford the thermoset polymer is undertaken only after the pressing and the optional forming step. The high final strength of the fibre composite component part is thus attained only when the fibre composite material has already been moulded into the metallic main body.

Essential to the success of the process according to the invention is the formulation of a polyurethane composition which allows two-stage crosslinking while achieving a high adhesion on metallic surfaces. The hereindescribed formulation fully meets these requirements and is additionally storage stable at temperatures below 100° C. Cooling to below room temperature is not necessary to prevent undesired crosslinking. It is therefore possible to store or to transport the thermoplastic polymer with the fibres embedded therein, cut-to-size pieces and/or precompressed layers thereof or else the workpiece comprising not-yet-cured matrix itself before it is subjected to further processing in the next step. It is thus possible to divide the production process between different facilities, thus even making it possible to operate the process beyond organizational boundaries. This markedly increases production flexibility and provides for large potential savings in production costs.

A further advantage of the hereindescribed polyurethane composition is that the temperatures and times required for performing the crosslinking reactions are matched to temperature regimes that prevail in heat treatment processes which are in any case provided in the context of metal processing. The exposure to heat to perform the crosslinking reactions may thus be performed in the course of such metallurgical heat treatments that are required in any case. This applies in particular for the second crosslinking reaction which is always performed in the presence of the metallic main body (the first crosslinking reaction may on account of the storage stability be effected in the absence of the metallic main body/the semifinished precursor thereof). The matching of the crosslinking temperatures and times to the metallurgical processes means that there is practically no further cost or complexity associated with performing the polymer-chemical crosslinking reactions.

The matrix of the fibre-reinforced stiffening employed in accordance with the invention belongs to the class of polyurethanes. Said matrix is formed by additional reaction of the two starting components binder and hardener. Binder and hardener are provided together with any added substances as a reactive composition.

Hydroxyl-containing organic substances are employed as binder. Contemplated therefor are in principle all polyol compounds typically employed in polyurethane chemistry. However, the polyols must have 3 to 6 hydroxyl groups. The number or else the functionality of the hydroxyl groups has a determining influence on the crosslinking density and thus on the mechanical properties of the cured matrix. To obtain a three-dimensionally tightly crosslinked thermoset polymer network a functionality of the polyol component of at least three is required. By contrast, a functionality greater than six leads to the polyurethane in the thermoset final state achieving an excessive crosslinking density and to embrittlement of the matrix. As a result the OH functionality of the polyol employed as binder must be between three and six. It will be appreciated that mixtures of various polyols may also be employed which will be the case in practice. When a plurality of polyols are employed the indications concerning functionality relate to average values of the polyol mixture.

In addition at least one of the polyols employed as binder must have not only hydroxyl groups but also additional polar functional groups which interact with metal surfaces. These include for example ester, carbonate, amide, urethane, urea, thioester or thiocarbonate groups. Examples of suitable polyols are linear or branched hydroxyl-containing polyesters, polycarbonates, polycaprolactones, polyesteramides, polyurethanes or polyacetals. In comparison polyethers or polythioethers have a markedly lower metal adhesion and are thus not suitable as the main constituent of the polyol mixture.

Best adhesion on metals is achieved by polyester polyols, and within this category of substances by polycaprolactones. Hence according to a preferred embodiment at least one polycaprolactone is used as binder.

However, substances of the category of polyether, achieve weak adhesion on metal. For this reason preferably a binder is employed having no polar functional groups with ether functionality.

The OH number of the polyols should be between 20 mg KOH/g and 500 mg KOH/g and the acid number thereof should be not more than 2 mg KOH/g. The OH number is determined as per DIN 53 240-2, and the acid number as per DIN EN ISO 2114. The molar mass is calculated from the sum of the hydroxyl and carboxyl end groups. The average molecular weight is 50 g/mol to 10 000 g/mol, preferably 100 g/mol to 5000 g/mol.

It is preferable when linear or lightly branched hydroxyl-containing polyesters—so-called polyester polyols—are employed. These are known for a good metal adhesion from their use in coil coating; cf Organic Coatings: Science and Technology, Z. W. Wicks, Jr. F. Jones, S. P. Pappas, Wiley-Interscience, New York 1999, chap. 24.2.1.2, page 459.

Polyester polyols are produced for example via a polycondensation reaction, i.e. by reaction of polyols with sub-stoichiometric amounts of polycarboxylic acids or derivatives thereof, for example polycarboxylic anhydrides, polycarboxylic esters of lower alcohols, lactones or hydroxycarboxylic acids.

Examples of diols suitable for producing polyester polyols include ethylene glycol, 1,2-propanediol, 1,3-propanediol, diethylene glycol, dipropylene glycol, triethylene glycol, tetraethylene glycol, 1,2-butanediol, 1,4-butanediol, 1,3-butylethylpropanediol, 1,3-methylpropanediol, 1,5-pentanediol, bis(1,4 hydroxymethyl)cyclohexane (cyclohexanedimethanol), glycerol, hexanediol, neopentylglycol, trimethylolethane, trimethylolpropane, pentaerythritol, bisphenol A, bisphenol B, bisphenol C, bisphenol F, norbornylene glycol, 1,4-benzyldimethanol, 1,4-benzyldiethanol, 2,4-dimethyl-2-ethyl-1,3 hexanediol, 1,4-butylene glycol, 2,3-butylene glycol, di-R-hydroxyethylbutanediol, 1,5-pentanediol, 1,6-hexanediol, 1,8-octanediol, decanediol, dodecanediol, neopentylglycol, cyclohexanediol, 3(4),8(9)-bis (hydroxymethyl)tricyclo[5.2.1.02,6]decane (dicidol), 2,2-bis(4-hydroxycyclohexyl)propane, 2,2-bis[4-(β-hydroxyethoxy)phenyl]propane, 2-methyl-1,3 propanediol, 2-methylpentane-1,5-diol, 2,2,4(2,4,4)-trimethyl-1,6-hexanediol, 1,2,6-hexanetriol, 1,2,4-butanetriol, tris(R-hydroxyethyl) isocyanurate, mannitol, sorbitol, polypropylene glycols, polybutylene glycols, xylylene glycol or neopentylglycol hydroxypivalate, 2-methylpropanediol, 2,2-dimethylpropanediol, diethylene glycol, 1,12-dodecanediol, 1,4-cyclohexanedimethanol, 1,2-cyclohexanediol and 1,4-cyclohexanediol.

Dicarboxylic acids or derivatives suitable for producing the polyester polyols may be aliphatic, cycloaliphatic, aromatic and/or heteroaromatic in nature and may optionally be substituted, for example by halogen atoms, and/or unsaturated.

Preferred dicarboxylic acids or derivatives include propionic acid, succinic acid, glutaric acid, adipic acid, suberic acid, azelaic and sebacic acid, azelaic and dodecanedioic acid, 2,2,4(2,4,4)-trimethyladipic acid, phthalic acid, phthalic anhydride, isophthalic acid, terephthalic acid, dimethyl terephthalate, tetrahydrophthalic acid, maleic acid, maleic anhydride and dimeric fatty acids.

The diols and dicarboxylic acids/derivatives thereof used for producing the polyester polyols may be employed in any desired mixtures.

Suitable polyester polyols further include those producible in known fashion by ring opening from lactones, such as c-caprolactone, and simple diols as starting molecules. Such polycaprolactones are obtainable for example from the product line Capa® from Perstorp, Sweden.

When polyester polyols are employed as binder the OH number thereof should be between 20 mg KOH/g and 500 mg KOH/g and the acid number thereof should be not more than 2 mg KOH/g. The OH number is determined as per DIN 53 240-2, and the acid number as per DIN EN ISO 2114. The molar mass is calculated from the sum of the hydroxyl and carboxyl end groups. The average molecular weight is 50 g/mol to 10 000 g/mol, preferably 100 g/mol to 5000 g/mol.

The second starting component of the polyurethane matrix is a latent hardener comprising at least two blocked isocyanate groups. A count of at least two blocked isocyanate groups per molecule (the so-called NCO functionality) is necessary to generate a close-meshed polymeric network having high mechanical strength after reaction with the employed polyols. It is preferable when the hardener comprises internally blocked isocyanate groups. Specifically, a uretdione is employed as hardener.

Uretdiones are obtained by di-/polymerization of isocyanates. Polyisocyanates comprising uretdione groups are well-known and are described for example in U.S. Pat. No. 4,476,054, U.S. Pat. No. 4,912,210, U.S. Pat. No. 4,929,724 and U.S. Pat. No. 5,329,003. The conversion of isocyanates into uretdiones is generally effected in the presence of soluble dimerization catalysts, for example dialkylaminopyridines, trialkylphosphines, phosphoric triamides or imidazoles. The reaction is preferably performed in the absence of solvents and is terminated by addition of catalyst poisons upon attainment of the desired conversion. Excess monomeric isocyanate is subsequently removed by short-path evaporation. If the catalyst is sufficiently volatile the reaction mixture can be freed of the catalyst in the course of the monomer removal. Addition of catalyst poisons may be eschewed in this case. A wide range of isocyanates is suitable in principle for producing polyisocyanates comprising uretdione groups.

The di- and polyisocyanates suitable for producing the uretdiones employable as hardeners in accordance with the invention may consist of any desired aliphatic, cycloaliphatic and/or (cyclo)aliphatic di- and/or polyisocyanates. Suitable aliphatic di- or polyisocyanates advantageously have 3 to 16 carbon atoms, preferably 4 to 12 carbon atoms, in the linear or branched alkylene moiety and suitable cycloaliphatic or (cyclo)aliphatic diisocyanates advantageously have 4 to 18 carbon atoms, preferably 6 to 15 carbon atoms, in the cycloalkylene moiety. The term (cyclo)aliphatic diisocyanate is well understood in the art as referring to both cyclically and aliphatically bonded NCO groups, as is the case with isophorone diisocyanate (IPDI) for example.

By contrast, cycloaliphatic diisocyanate is understood to refer to diisocyanates having only NCO groups bonded directly to the cycloaliphatic ring, for example diisocyanatodicyclohexylmethane (H12MDI). Further examples include cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate, dodecane di- and triisocyanates. Likewise suitable are 4-methylcyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methylpentane.

Preferred uretdiones are produced from isophorone diisocyanate (IPDI), hexamethylene diisocyanate (HDI), diisocyanatodicyclohexylmethane (H12MDI), 2-methylpentane diisocyanate (MPDI), mixtures of 2,2,4-trimethylhexamethylene diisocyanate and 2,4,4-trimethylhexamethylene diisocyanate (TMDI), and norbornane diisocyanate (NBDI). Particular preference is given to using IPDI, HDI, TMDI and/or H12MDI. Very particular preference is given to using the uretdione of IPDI and/or HDI. Mixtures of any to-specification uretdiones may also be used as hardener.

The preferably employed uretdiones are free from external blocking agents. The internal blocking via the dimerization to the uretdione structure is reversible; at elevated temperature the uretdione retrocleaves back into the two isocyanate groups originally present which can crosslink with the binder. The advantage compared to external blocking agents is that the cleavage forms no volatile byproducts. These can lead to formation of gas bubbles between the fibre composite material and the metal surface/between the individual prepreg layers of the stiffening and thus to delamination.

In addition to the two absolutely necessary starting components hardener and binder the reactive composition may also comprise further components:

Mention may be made initially of a co-binder which together with a corresponding (second) hardener likewise undergoes crosslinking to a low degree of curing during the first crosslinking reaction and final crosslinking in the second crosslinking reaction. This results not only in a further improvement in the mechanical properties in the crosslinked state but also in an additional improvement in the metal adhesion via polar interactions.

An oxirane-containing compound is used as cobinder. Contemplated in principle are all epoxy resins, for example, polyepoxides based on bisphenol A diglycidyl ether, bisphenol F diglycidyl ether or cycloaliphatic types, for example 3,4-epoxycyclohexylepoxyethane or 3,4-epoxycyclohexyl-methyl-3,4-epoxycyclohexanecarboxylate. Mixtures of different epoxy resins may also be employed as cobinder in accordance with the invention. The cobinder results in an improvement in the metal adhesion of the matrix coupled with an additional crosslinking. Since the cobinder is provided in the reactive composition it need not be separately applied like an adhesive before the attachment of the thermoplastic to the metal. On the contrary it improves the intrinsically adhesive properties of the matrix.

The epoxy equivalent weight (EEW) of the cobinder, determined as per ASTM D 1652, is preferably between 100 and 1000 g/eq. When epoxy compounds having an EEW above 1000 g/eq are employed the viscosity of the matrix increases very severely so that processing is impeded. Severe embrittlement of the matrix also results so that the mechanical properties fall.

Suitable corresponding hardeners for the cobinder include aliphatic or cycloaliphatic polyamines, polyetheramines, polymercaptans or polyamidoamines. However, preference is given to polycarboxylic acids or rather polycarboxylic anhydrides which at elevated temperatures undergo a ring opening reaction with the oxirane component of the cobinder to afford carboxylic esters.

Particular preference is given to using the oligomeric adducts of benzene-1,2,4-tricarboxylic-1,2-anhydride or pyromellitic anhydride with ethylene glycol and glycerol as the corresponding hardener for the cobinder.

The reactive composition may additionally comprise further components, for instance processing aids or added substances such as rheology modifiers, release agents, fillers, deaerators, defoamers, flow assistants, wetting agents, flame retardants, colour pigments and/or flow control agents. Such components are referred to hereinbelow by the umbrella term "additives".

In addition, the reactivity of the composition may if required be accelerated by addition of a catalyst. However, when adding a catalyst care should be taken to ensure that the requirements concerning storage stability of the thermoplastic polyurethane matrix continue to be met. A particular embodiment of the invention even provides that the reactive composition is intentionally free from substances that exhibit catalytic activity in the first and/or second crosslinking reaction in order not to bring about an unwanted crosslinking and thus diminish the storage stability.

Catalytically active substances in this connection are quaternary ammonium salts, preferably tetraalkylammonium salts and/or quaternary phosphonium salts having halogens, hydroxides, alkoxides or organic or inorganic acid anions as the counterion. Examples thereof include tetramethylammonium formate, acetate, propionate, butyrate or benzoate, and the corresponding tetraethyl-, tetrapropyl- and tetrabutylammonium or -phosphonium salts.

The reactive composition may be provided in dry or liquid form as desired.

In dry form the reactive composition is a powder. Said powder is broadcast and/or melted onto the fibres so that it does not fall off the fibres prior to the incipient crosslinking.

Alternatively the constituents of the composition are dissolved in a liquid solvent or at least suspended or dispersed therein if not all constituents are soluble. The composition is thus practically liquid and the fibres are impregnated with the liquid composition. The composition provided in liquid form in the solvent is technologically easier to handle than dry, pulverulent compositions. A possible disadvantage of the use of solvents is volatile constituents remaining after insufficient drying which remain in the polymer after the first crosslinking reaction and can lead to bubble formation. However, removal of the solvent takes place in the course of performing the first crosslinking reaction via evaporation during the in any case necessary heat treatment so that no additional operation becomes necessary.

Accordingly, the solvent must not only dissolve the components of the reactive composition as completely as possible but must also be volatilized as completely as possible during the exposure of the composition to heat undertaken to perform the first crosslinking reaction.

Solvents suitable for this purpose are polar, aprotic substances having high boiling points, such as esters and/or ketones. It is particularly preferable to employ the substances isopropyl acetate and methyl isobutyl ketone as solvent. It is also possible to use mixtures of a plurality of substances as solvent. For cost and environmental reasons the amount of solvent should be reduced to a necessary minimum. It is preferable to employ 35 to 50 weight percent of solvent based on the total weight of the mixture.

The abovedescribed components are formulated in the following amounts to afford the reactive composition:
binder: 10 wt % to 80 wt %;
hardener: 20 wt % to 90 wt %;
cobinder: 0 wt % to 15 wt %;
corresponding hardener 0 wt % to 20 wt %
additives: 0 wt % to 5 wt %;
solvent: 0 wt % to 50 wt %.

It will be appreciated that these components sum to 100 weight percent. If a solvent is used said solvent is regarded as a constituent of the reactive composition.

The specified formulation also has the technological advantage that it is water-free and that no water is formed during the reaction either. This is because water residues in the hybrid component part could result in the metallic main body rusting from the inside and the adhesion to the fibre composite material being impaired. In this context a composition comprising 0 ppmw to 500 ppmw of water is to be understood as being water-free. However this water is not intentionally added but will accumulate in the composition from the damp ambient air especially when hygroscopic formulation constituents are used.

Now that the chemistry of the polyurethane formulation used as the reactive composition in accordance with the invention has been extensively described the process engineering aspects of the invention shall be more particularly elucidated.

The way in which the fibres are provided depends on the fibres used and the form in which they are obtainable. The fibres themselves are made of the customary fibre materials such as glass, carbon, aramid. However it is also possible to employ fibres made of basalt, metal or organic materials from nature. The fibres may be in the form of short staple fibre or endless filaments. The fibres are generally provided not loose but as a sheetlike and/or linear textile structure. The sheetlike textile structure may be wovens, laids, knits, unidirectional fibre bundles or fibrous webs made of the relevant fibre material. Linear textile structures are rovings, yarns or braids. Sheetlike textile structures may in turn be constructed from the linear textile structure, for instance when a yarn is woven. There are no limits to the dimensions of the sheetlike textile structure; in particular tapes or ribbons may also be employed. The sheetlike textile structure is provided in individual cut-to-size formats but is preferably unwound from a roll as a continuous web.

If the reactive composition is used as a dry powder mixture the step of coating the fibres with the composition is effected simply by broadcasting. The melting and incipient crosslinking (first crosslinking reaction) is effected by supply of heat, for instance by contact heating or heat radiation. The supply of heat triggers the addition polymerization between the hardener and the binder to a small extent. The reaction conversion is sufficiently low under the chosen process conditions to result in merely an increase in the molecular weight but not yet in formation of a three-dimensional network. This accordingly results in a thermoplastic which may be reversibly melted and cooled down again. Due to the heat the thermoplastic is in the form of a low-viscosity melt and penetrates into the interspaces between the fibres. The fibres are thus embedded in the thermoplastic polymer. The powder route is therefore particularly environmentally friendly since no solvents need be employed and removed.

In the case where the reactive composition is to be processed in the liquid state, binder and hardener are provided dissolved in a solvent. The step of coating the fibres/the sheetlike textile structure is effected by impregnation thereof with the solution. Compared to broadcasting powder this has the advantage that the reactive mixture will thus also penetrate deeply into the sheetlike textile structure, thereby improving the adhesion of the mixture to the textile during manufacture and later of the fibre-matrix composite. A liquid composition is therefore preferred over the powder variant.

The impregnation of the fibres/of the sheetlike textile structure is accomplished by soaking, submerging or other processes suitable for processing. It is essential that the fibres are enveloped by the solution. This is achieved when the solution fills the interspaces between the fibres as completely as possible. It is in principle conceivable not to impregnate the entirety of the fibres but merely individual fibre sections. Impregnation is preferably effected continuously in a roll-to-roll process.

The solvents specified above may be readily removed again from the sheetlike textile structure after impregnation by evaporation. This requires only low temperatures on account of the high volatility of these solvents. These solvents additionally make it possible to achieve negligible residual solvent contents below one weight percent, preferably below 0.5 weight percent, after drying.

The process step of evaporating the solvent and the performance of the first crosslinking reaction is preferably effected in one operation by heat treatment at a temperature of 80° C. to 170° C., preferably at a temperature of 120° C. to 160° C. and particularly preferably at a temperature of 140° C. to 160° C. The duration of heat treatment is one minute to 60 minutes, preferably ten minutes to 30 minutes. The exposure to heat is best effected in contactless fashion with infrared radiation or heat radiation. The heat may also be applied with a hot gas stream. The heat brings about the evaporation of the solvent and also the reaction of hardener and binder to afford the thermoplastic polymer. Since the fibres were impregnated with the solution the fibres are deeply embedded in the thermoplastic formed. When the impregnated fibres are present on a roll the evaporating of the solvent and the performance of the first crosslinking reaction is most rationally effected on this roll, for example in a continuous oven.

On completion of the first crosslinking reaction the prepreg formed, i.e. the thermoplastic polymer having the fibres embedded therein, is converted. This is necessary in particular when the prepreg comes from a roll. Converting comprises initially cutting the thermoplastic polymer to size and stacking the individual prepreg layers. The number of layers depends on the intended thickness of the later stiffening. It is also possible to employ different prepreg materials in the individual layers. The prepared stacks are then cut to size to afford the required geometry in a cutting apparatus. The cutting to size employs commonly employed technologies such as laser or waterjet cutting. Cutting to size is preferably carried out such that as much material as possible is utilized and scrap is reduced. The thermoplastic polymer of the scrap may incidentally be reused in the process by melting it off. However, the thus uncovered fibres must normally be disposed of. The material may alternatively be compressed as short cut.

The production of the prepregs, i.e. the coating of the fibres with the composition and the performance of the first crosslinking reaction and optionally also the converting of the layers or stacks, is preferably effected in the absence of the metallic main body/the semifinished precursor thereof. More precisely, the prepreg is produced at a separate location, in another business or another organization than the location, the business or the organisation in which the metal part is provided with the fibre composite reinforcement and the hybrid component part is thus produced. In this way each business can concentrate on its core competencies and the producer of the prepregs can supply several producers of different hybrid component parts. This enormously enhances production flexibility and lowers production costs. This is possible only because the thermoplastic polymer is storage stable at room temperature without cooling, i.e. approximately between 15° C. and 30° C., for up to about one year. In the meantime it may be transported worldwide between the producer of the prepreg and the producer of the actual hybrid component part and optionally also stored in an intermediate storage facility. Nevertheless, it is also possible to initially produce the prepreg and then the entire hybrid component part in one organization on one production line. Accordingly a period of from one day to one year may elapse between the performance of the first crosslinking reaction (production of the prepreg) and performance of the second crosslinking reaction (production of the actual hybrid component part) in which the thermoplastic polymer comprising the embedded fibres (the prepreg) is stored and/or transported.

In the production of the actual hybrid component part the metallic main body of the hybrid component part is provided with the local reinforcement made of the fibre composite material.

If the thermoplastic polymer comprising the fibres embedded therein is provided in layerwise fashion the sequence of steps of placing and pressing is accordingly carried out repeatedly to place and press onto the metal in layerwise fashion the thermoplastic polymer comprising the fibres embedded therein. Stacking the layers to form the stiffening only on the metal part allows the layers to be more flexibly employed for different hybrid component parts. However, the main argument for pressing individual layers is better drapability since a single layer is not as stiff as a stack of a plurality of layers.

Alternatively, the individual layers of the thermoplastic polymer comprising the fibres embedded therein may be compressed to afford a stack in the absence of the main body/the semifinished precursor thereof. The sequence of steps of placing and pressing is then effected by placing and pressing the stack onto the main body/the semifinished precursor thereof. The stack is thus a reinforcement patch which is specially preconverted for the hybrid component part and after pressing-on requires only curing. The stack is thus specially adapted for the respective hybrid component part which optimizes the lightweight construction thereof. The pressing of the stack may be effected more rapidly than the application of individual layers.

The layerwise/stackwise application of the thermoplastic polymer onto the metal part generally corresponds to the customary processing of prepregs.

Since the thermoplastic polymer is still flexible it may still be deformed together with the metal part. The process according to the invention therefore offers the option of either providing the metallic main body in its final geometry or else—and this is particularly interesting in terms of manufacturing technology—initially providing merely a semifinished precursor of the later metallic main body and converting said precursor into the final geometry together with the thermoplastic polymer adherent thereto. The semifinished precursor is formed into the main body with customary metal processing technology. Contemplated processes are in particular those established in sheet metal forming, for instance bending, pressing or deep drawing. Massive forming processes are not as suitable since the metallic main body has rather slim dimensions from the point of view of lightweight construction and therefore indeed also requires stiffening.

Depending whether the metal part is already in the final geometry or is still to be subjected to further forming in the context of the production process according to the invention the thermoplastic polymer comprising the fibres embedded therein is placed onto the main body/onto the semifinished precursor thereof. The placing is effected in a localized region of the main body/the semifinished precursor thereof since the later reinforcement extends only locally.

On account of the adhesive properties of the hereindescribed polyurethane formulation the thermoplastic material adheres to the intended location and remains there even when the main body with attached thermoplastic is rotated, turned or transported. Even when the metal flows away during forming of the semifinished precursor the thermoplastic polymer remains adherent to the flowing metal and undergoes corresponding deformation. The associated change in position is to be taken into account when placing the prepreg on the semifinished precursor.

In the next step the cut-to-size prepreg stack is joined to the metallic main body/the semifinished precursor thereof by pressing. This is achieved either by inserting the precrosslinked fibre composite material into the main body or conversely by placing the main body over the fibre composite material. The joining is preferably performed under pressure in a press to ensure a complete bond between the two surfaces and minimize air inclusions. Since the thermoplastic polymer is already adherent to the metal part without any further assistance additional adhesives are not required. A preferred development of the invention therefore provides that the thermoplastic polymer comprising the fibres embedded therein is placed at the localized region of the main body/the semifinished precursor thereof without the use of an additional adhesive. This makes it possible to achieve a marked saving in process costs. The time required for bonding is to be kept as short as possible in order to adhere to the cycle times customary in the automobile industry. The duration of the joining and pressing operation is preferably less than five minutes, particularly preferably less than one minute.

It is also possible to apply a facing onto the thermoplastic material. Underlying this is that fibre composite materials are not always visually attractive and are rejected by customers especially in the automobile sector. In order to avoid the customer categorizing the stiffening as poor quality plastic the still thermoplastic matrix may be provided with a facing made of a thin metal foil or a plastic with a high-quality appearance which covers the stiffening on the later visible side of the hybrid component part. The facing has no mechanical function and is accordingly non-load-bearing. The mechanical function of stiffening the metallic main body is assumed solely by the fibre composite material.

The facing also provides the process engineering advantage that during the subsequent curing at elevated temperatures the still thermoplastic, tacky matrix material does not come into contact with further component parts or the oven so as to unwantedly adhere thereto.

On account of the adhesive properties of the thermoplastic the facing adheres thereto without further bonding agents. If a metal foil is used as the facing and later coated together with the metallic main body the coated hybrid component part appears to the customer to be a conventional metal component part.

Thus in a preferred development of the invention, before exposure of the thermoplastic polymer to heat a facing is applied to the thermoplastic polymer and compressed therewith such that after performance of the second crosslinking reaction the facing adheres to the thermoset matrix and the stiffening of the hybrid component part is faced on its visible side.

The joining of the metallic main body and the thermoplastic polymer/the forming of the semifinished precursor with thermoplastic adherent thereto is followed by the second crosslinking reaction of the still thermoplastic matrix to afford the final thermoset. This requires exposure of the thermoplastic to heat. This is accomplished for example with the aid of heat radiation, infrared radiation or with a heating gas. The heat treatment causes the polyurethane to undergo complete crosslinking and said polyurethane thus obtains its thermoset properties and the stiffening obtains its final strength. Further forming of the metal in the region of the stiffening is then no longer possible; only regions of the hybrid component part which are not stiffened by the local thermoset, fibre-reinforced stiffening could subsequently be subjected to further forming.

It will be appreciated that it is possible to provide the metal with a plurality of stiffenings and to place these consecutively and crosslink them simultaneously or consecutively. The hybrid component part may thus comprise a plurality of localized stiffenings.

The hereindescribed polyurethane formulation allows for full crosslinking at a temperature between 160° C. and 220° C., a temperature between 180° C. and 200° C. being optimal. Preferred developments of the invention are thus based on the second crosslinking reaction being performed at temperatures of 160° C. to 220° C., particularly preferably at temperatures of 180° C. to 200° C. In particular the second crosslinking should be effected at a temperature at least 20° C. higher than the temperature at which the first crosslinking reaction is performed. The duration of the heat treatment is in the range from several minutes to a few hours, preferably 20 to 60 minutes.

This temperature regime is advantageous because such temperatures also prevail in heat treatment steps to which the metallic component part must in any case be subjected. These may for example be metallurgical microstructure changes of the metal such as for example hardening or stress relief annealing. However, the heat treatment may also be a substep of a surface technology for instance baking of a corrosion protection layer. Since hybrid component parts employed in automobiles in particular are in any case subjected to cathodic electrocoating which concludes with a heat treatment of the electrophoretically applied coating in the temperature range at issue, it is possible to perform the second crosslinking reaction in the course of the curing of a corrosion protection layer electrophoretically applied to the metallic main body. It is preferable when the process step of baking the coating layer after the cathodic electrocoating is utilized to this end. In this way the curing of the matrix can be integrated into the process without the need for an additional process step. A similar approach is described in US2015/0174642A1.

The metallic main body/the semifinished precursor thereof is in the simplest case made of a conventional metal material such as steel or an aluminium or magnesium alloy.

However, one preferred embodiment of the invention provides that the metallic main body is composed of a steel, the microstructure of which in the course of performance of the second crosslinking reaction undergoes a transformation and/or change. The properties of the metallic material in particular, for example strength or energy absorption, undergo a change. It is for example possible to employ heat-hardening steel materials composed of an expandable ferritic matrix with hard martensitic or bainitic phases incorporated therein. The two material changes "phase transformation of the metal" and "full crosslinking of the matrix" can thus be performed in one process step, thus saving time and energy.

The abovementioned metallurgical phase transformation is described in detail in "Structure and mechanical properties of dual phase steels", Ylva Granbom, Doctoral thesis 2010, Royal Institute of Technology School of Industrial Engineering and Management SE-100 44 Stockholm, Sweden.

Steels having a microstructure of this type which make the usability of this metallurgical effect possible are known as dual-phase steels (DP) and, commercially, also as bake-hardening steels (BHZ). Thus in the context of the hereindescribed process it is preferable to employ a metallic main body/a semifinished precursor made of a bake-hardening steel or of a dual-phase steel since the strength of these steels can be enhanced in the two heat treatment steps just as can that of the two-stage-crosslinkable polyurethane composition. BHZ or DP steels are commercially available for vehicle body construction from the major steel producers such as for instance the DP-W® and DP-K® dual phase steels from ThyssenKrupp Steel Europe AG.

When metallurgical transformations are still performed in the course of performance of the second crosslinking reaction the process steps performed previously in the presence of the metallic main body/the semifinished precursor thereof should be effected at lower temperatures so that the metallurgical change/transformation and the crosslinking of the matrix does not set in prematurely.

Accordingly, a preferred development of the process provides that the pressing of the thermoplastic polymer onto the main body/the semifinished precursor thereof is effected at a temperature of 20° C. to 25° C. These temperatures are well below those at which the second crosslinking and any metallurgical transformation are effected. These temperatures also correspond to the normal room temperatures in a manufacturing facility and therefore no additional temperature control measures are necessary. In particular the hereindescribed polyurethane prepregs need not be heated to room temperature before placing since, in contrast to epoxide prepregs, they are not kept in refrigerated storage.

With the proviso that a semifinished precursor of the main body is provided and formed into the main body with adherent thermoplastic polymer the forming of the semifinished precursor into the main body should be effected at a temperature of 20° C. to 150° C. so that the second crosslinking reaction is not induced during the forming. If the semifinished precursor comprising the thermoplastic polymer adherent thereto is still too cold the semifinished precursor is heated before forming/a heated forming apparatus is employed.

The employed sheet metals may optionally already be provided with a corrosion protection layer. Galvanized sheet steel or sheet metals coated with a polyurethane-based coating are contemplated. It is also possible that the metal still has on its surface residues of a deep drawing oil or similar substances employed during the forming process. The adhesion of the polyurethane composition according to the invention is not significantly impaired thereby.

The hereindescribed process is ideally carried out distributed over various production sites. These may even belong to different organizations and may be operated a great distance apart. Thus, a chemical company may provide the reactive composition and supply this to a prepreg producer. Said producer applies the composition to the fibres, performs the first crosslinking reaction and optionally converts the thermoplastic polymer with the embedded fibres. The actual hybrid component part may then be created at the premises of a third producer by said producer providing the metallic main body/the semifinished precursor thereof with the reinforcement and optionally also forming the resulting hybrid. The second crosslinking reaction may then be effected in a fourth organization which performs the cathodic electrocoating of the workpiece and fully crosslinks the thermoplastic matrix to afford the thermoset upon baking of the coating. If the metallic main body/the semifinished precursor thereof is also provided by a metal producer, performance of the process according to the invention involved essential contributions from five specialized organizations in total. This shows the flexibility with which the present process may be performed.

Performance of the process affords a hybrid component part comprising a metallic main body provided with at least one local stiffening made of a fibre composite material, wherein the fibre composite material comprises a polyurethane-based thermoset matrix and fibres embedded therein. The product of the process likewise forms part of the subject matter of the invention.

A preferred development provides that the stiffening of the hybrid component part has been provided with a non-load-bearing facing on a visible side. A hybrid component part having a facing on a visible side is obtained by pressing the facing—for instance a foil made of metal or plastic—onto the still thermoplastic matrix. It remains fixed thereon without further joining means such as screws or adhesive. The facing may be coated together with the metallic main body, for example electrophoretically. Afterwards, the hybrid component part is no longer identifiable as such but appears purely metallic to the observer.

It is an essential aspect of the hereindescribed invention that the stiffening of the metallic main body with the fibre composite material is not an all-over stiffening but rather is restricted to an intentionally selected, limited region of the metallic main body. The stiffening is located at a position where in normal use of the hybrid component part said part is at least intermittently subjected to a local stress maximum. This means that in the immediate vicinity of the stiffening, outside the stiffened region, lower mechanical stresses act on the hybrid component part than inside the stiffened region. Having said that, this does not mean that the most severely stressed region of the entire hybrid component part (global stress maximum) need be in the stiffening. If a plurality of local stress maxima arise a plurality of local stiffenings are accordingly to be provided. If these are close together they can also be captured by a common stiffening.

The underlying idea is to give the hybrid component part dimensions such that at least a more severely stressed region is selectively stiffened with the fibre composite material in order to save metal and thus weight (lightweight construction).

The shape, position and orientation of the stiffening depends on the stress on the hybrid component part that is typically to be expected. In the course of construction of the hybrid component part it is therefore necessary to assume the forces and moments acting on the hybrid component part in its later use and to determine therefrom the locations of the local stress maxima in the component part. These locations are then to be stiffened with the fibre composite material. The geometry of the locations ultimately determines the shape of the stiffening. The fibres are preferably oriented in the direction of force transmission through the stiffened region. The local stress maxima are determined in computer-aided fashion by the finite element method (FEM).

Since the intended use of the hybrid component part determines its stiffening the use of the hybrid component part is inventive when it is effected in a way in which a local stress maximum acts in the stiffening.

The hybrid component part is preferably tethered to adjacent component parts or component assemblies exclusively via the metallic main body since it is constructionally easier to accomplish tethering to the metal than to the fibre composite material. Force introduction into the stiffening is thus effected essentially via the contact surface between the metallic main body and the matrix and is ensured by the good metal adhesion of the polyurethane composition proposed herein.

EXAMPLES

The invention shall now be elucidated with reference to examples.

Torayca FT 300 3K 200tex carbon fibres were processed in all experiments. The fibres were in the form of a twill-weave sheetlike textile structure, manufactured by Engineered Cramer Composites (ECC), Typ Style e452. The basis weight was 200 g/m².

Metallic main bodies in the form of a miniature B-pillar supplied by Benteler Automobiltechnik were employed. The metallic main bodies are made of a hot-formed steel (22MnB5 alloy)/a readily formable aluminium alloy.

In the noninventive comparative example 0 a reactive polyurethane composition was chosen which was produced as per example 2 of US2014087613A1. The formulation is reported in table 0. Since the binder does not comprise a polar functional group selected from an ester, carbonate, amide, urethane, urea, thioester or thiocarbonate functionality, the formulation is not an inventive one.

For the inventive example 1 a reactive composition having a formulation as per table 1 was employed.

TABLE 0

Formulation 0 of the reactive composition in comparative example 0

| description | starting weight/wt % | producer/ supplier |
| --- | --- | --- |
| uretdione-containing hardener Vestagon B11604 (NCO content: 7.7%) | 65.3 | Evonik Industries |
| binder: tetrafunctional polyether polyol 4640 (OHN: 630 mg KOH/g) | 10.9 | Perstorp |
| degasifier benzoin | 0.2 | Aldrich |
| butyl acetate | 23.6 | Fluka |

TABLE 1

Formulation 1 of the reactive composition in inventive example 1

| description | starting weight/wt % | producer/ supplier |
| --- | --- | --- |
| uretdione-containing hardener Vestagon BF 1320 (NCO content: 14%) | 27.7 | Evonik Industries |
| binder: tetrafunctional polyester Capa 4101 (OHN: 224 mg KOH/g) | 21.2 | Perstorp |
| oxirane-containing cobinder Epikote Resin 828 | 6.9 | Momentive |
| Aradur 3380 | 1.1 | Huntsman Advanced Materials |
| additive TegoWet 500 | 0.3 | Evonik Industries |
| methylisobutylketone | 21.4 | Fluka |
| isopropyl acetate | 21.4 | Fluka |

The employed substances from the tables were in each case processed with a dissolver to afford a homogeneous solution, the reactive composition.

To coat the sheetlike textile structure with the reactive composition the carbon fibre fabric was impregnated with the solution and then dried in an oven for 10 minutes at 150° C. The fibre volume content was 45 volume percent.

The thus obtained thermoplastic polymer comprising the embedded fibres (prepreg) was then stored for approximately three weeks at 20° C. Then, four layers were respectively cut to size to dimensions of 8×4 cm and compressed into stacks at a temperature of 150° C. and a pressure of 3 bar (i.e. $3*10^5$ Pa) for 3 minutes with a Vogt LaboPress P 400 S laboratory press. After compressing, the stacks were cooled back down to 20° C.

The stack produced from formulation 1 was then able to be draped into the miniature B-pillar as a local reinforcement element. On account of the intrinsic tackiness of the prepreg, pressing with hand force without additional pretreatment of the metal surface was sufficient to ensure adequate adhesion during further handling both on steel and on aluminium. An additional adhesive was not employed. Nevertheless no detachment was observed upon transport or 180° rotation of the metal part. The workpiece with the thermoplastic polymer adherent thereon was then cured in an oven at a temperature of 200° C. over 30 minutes without additional affixing. Adhesion to the metallic main body was retained and a locally thermoset-reinforced hybrid component part was thus obtained.

By contrast, the adhesion of the stack produced from formulation 0 was not sufficient; the local reinforcement patch detached from the metal surface again.

The comparison teaches that only the inventive polyurethane formulation is suitable for local stiffening of metal parts.

In Example 1 Epikote Resin 828 (an epoxy resin) was used as a cobinder. Corresponding hardener to this cobinder was Aradur 3380 (a epoxy binder). As set out below it is shown that even without using a cobinder and a hardener corresponding to the cobinder adhesion on metal can be improved.

TABLE 2

Formulation 2 of the reactive composition in inventive example 2

| description | starting weight/wt % | producer/supplier |
|---|---|---|
| uretdione-containing hardener Vestagon B11604 (NCO content: 12.8%) | 37 | Evonik Industries |
| binder: Polycaprolactone Capa 3031 (OHN: 560 mg KOH/g) | 13 | Perstorp |
| solvent methylisobutylketone | 25 | Fluka |
| solvent isopropyl acetate | 25 | Fluka |

TABLE 3

Formulation 3 of the reactive composition in inventive example 3

| description | starting weight/wt % | producer/supplier |
|---|---|---|
| uretdione-containing hardener Vestagon BF1320 (NCO content: 14%) | 33 | Evonik Industries |
| binder: Polycaprolactone Capa 4101 (OH N: 224 mg KOH/g) | 28 | Perstorp |
| solvent methylisobutylketone | 19.5 | Fluka |
| solvent isopropyl acetate | 19.5 | Fluka |

For assessment of adhesion on metal tensile shear strength has been measured according to DIN EN 1465.

Test bodies have been manufactured as follows: On metal sheets made from steel DC04 ZE 75/75 and aluminium 6016 respectively each one unreacted stack consisting of four prepreg layers has been pressed and reacted. Said prepregs consisted from formulations 0, 1, 2, 3 and from carbon fibres Torayca FT 300 3K 200tex in form of a twill-weave sheet-like textile structure with a basis weight of 200 g/m$^2$. Said stack was prepared at a pressure of 2.5*10$^5$ Pa and a temperature of 150° C. for 5 minutes. Subjected to this conditions no cross-linking occurred. Pressing and cross-linking on metal was performed at a temperature of 200° C. and a pressure of 2.5*10$^5$ Pa for 30 minutes. Subsequently, the setting was chilled to room temperature for 30 minutes under 2.5*10$^5$ Pa within the press.

Each five test bodies of different material combinations have been tested and measured tensile tear strength has been averaged. Results are displayed in table 4:

TABLE 4

Results of assessment of tensile shear strength

| Test run | metal | formulation | tensile shear strength |
|---|---|---|---|
| I | steel | 0 | 0 MPa (not gaugeable) |
| II | aluminium | 0 | 0.8 MPa |
| III | steel | 1 | 9.1 MPa |
| IV | aluminium | 1 | 7.8 MPa |
| V | aluminium | 2 | 4.3 MPa |
| VI | aluminium | 3 | 1.6 MPa |

Tensile shear strengths measured according to DIN EN 1465 are a meaningful measure for the degree of adhesion on metal achieved by the prepregs. According to the results adhesion of formulation 1 comprising cobinder and corresponding hardener is by far the strongest (compare runs III and IV with the other ones).

But even formulation 2 without cobinder and corresponding hardener adheres significantly better than formulation 0 (prior art) comprising a polyether polyol (compare run V with runs I and II).

What is claimed is:

1. Process for producing a hybrid component part comprising the steps of:
    a) providing a reactive composition at least comprising:
        at least one hardener which is a uretdione having an NCO functionality of at least two,
        at least one binder which is a polyol compound having an OH functionality of 3 to 6 and which comprises at least one polar functional group selected from an ester, carbonate, amide, urethane, urea, thioester or thiocarbonate functionality;
    b) providing fibres;
    c) coating the fibres with the reactive composition;
    d) exposing at least the reactive composition to heat to perform a first crosslinking reaction in the course of which hardener and binder are converted into a thermoplastic polymer, thus embedding the fibres into the thermoplastic polymer;
    e) providing a metallic main body or a semifinished precursor thereof;
    f) placing the thermoplastic polymer comprising the fibres embedded therein onto a localized area of the main body/semifinished precursor thereof;
    g) pressing the thermoplastic polymer onto the main body/semifinished precursor thereof so that the fibres adhere to the main body/semifinished precursor thereof via the thermoplastic polymer;
    h) forming the semifinished precursor comprising the thermoplastic polymer adherent thereto to afford the metallic main body provided that only a semifinished precursor of the main body was provided in step e);
    i) exposing at least the thermoplastic polymer to heat to perform a second crosslinking reaction in the course of which the thermoplastic polymer is converted to a thermoset polymer;
    k) obtaining the hybrid component part comprising at least the metallic main body provided with at least one local stiffening composed of a fibre composite material, wherein the fibre composite material comprises a matrix formed from the thermoset polymer and the fibres embedded therein,
        wherein the thermoplastic polymer comprising the fibres embedded therein is provided in layerwise fashion, in that the layers are compressed to afford a stack in the absence of the main body/the semifinished precursor thereof and in that the sequence of steps f) and g) is effected by placing and pressing the stack onto the main body/the semifinished precursor thereof.

2. Process according to claim 1, characterized in that the second crosslinking reaction is performed at a temperature between 160° C. and 220° C.

3. Process according to claim 2, characterized in that the main body is composed of a steel which in the course of performance of the second crosslinking reaction undergoes a change and/or rearrangement of its microstructure.

4. Process according to claim 1, characterized in that the placing and/or the pressing of the thermoplastic polymer onto the main body/the semifinished precursor thereof is effected at a temperature of 20° C. to 25° C.

5. Process according to claim 2 with the proviso that a semifinished precursor of the main body is provided and formed into the main body with adherent thermoplastic polymer, characterized in that the forming of the semifinished precursor into the main body is effected at a temperature of 20° C. to 150° C., if necessary after heating of the semifinished precursor and/or by using a heated forming apparatus.

6. Process according to claim 1, characterized in that the first crosslinking reaction is performed in the absence of the metallic main body/the semifinished precursor thereof.

7. Process according to claim 6, characterized in that after performance of the first crosslinking reaction a period of one day to one year elapses before the second crosslinking reaction is performed and in that the thermoplastic polymer comprising the fibres embedded therein is stored and/or transported at temperatures between 15° C. and 30° C. over this period.

8. Process according to claim 1, characterized in that as hardener uretdiones free from blocking agents are employed which are produced from at least one of the following substances:
isophorone diisocyanate (IPDI), hexamethylene diisocyanate (HDI), diisocyanatodicyclohexylmethane (H12MDI), 2-methylpentane diisocyanate (MPDI), mixtures of 2,2,4-trimethylhexamethylene diisocyanate and 2,4,4-trimethylhexamethylene diisocyanate (TMDI), and norbornane diisocyanate (NBDI).

9. Process according to claim 1, characterized in that at least one polycaprolactone is employed as binder.

10. Process according to claim 1, characterized in that as binder at least one polyester polyol is employed which has an OH number between 20 mg KOH/g and 500 mg KOH/g, an acid number of not more than 2 mg KOH/g and a molar mass between 100 g/mol and 5000 g/mol.

11. Process according to claim 1, characterized in that the composition comprises at least one cobinder, wherein as cobinder epoxy resins are employed which are selected from the group comprising epoxy resins based on bisphenol A diglycidyl ether, epoxy resins based on bisphenol F diglycidyl ether and cycloaliphatic types, for example 3,4-epoxycyclohexylepoxyethane or 3,4-epoxycyclohexylmethyl-3,4-epoxycyclohexanecarboxylate.

12. Process according to claim 11, characterized in that the composition comprises a hardener corresponding to the cobinder which is selected from the group comprising the following substance classes: polycarboxylic acid, polycarboxylic anhydride, aliphatic polyamines, cycloaliphatic polyamines, polyetheramines, polymercaptans or polyamidoamines.

13. Process according to claim 1, characterized in that the composition is free from substances that exhibit catalytic activity for the first and/or second crosslinking reaction.

14. Process according to claim 1, characterized in that the composition is provided in a liquid solvent, wherein the constituents of the composition are dissolved and/or suspended and/or dispersed in the solvent so that the coating of the fibres with the composition is effected by impregnating the fibres with the solvent and in that the constituents dissolved/suspended/dispersed therein, and in that the solvent is at least partly evaporated from the fibres in the course of performance of the first crosslinking reaction, wherein the solvent is an ester or a ketone or a mixture comprising at least one ester and/or at least one ketone.

15. Process according to claim 1, characterized in that the thermoplastic polymer comprising the fibres embedded therein is placed at the localized region of the main body/the semifinished precursor thereof without the use of an additional adhesive.

16. Hybrid component part comprising a metallic main body provided with at least one local stiffening made of a fibre composite material, wherein the fibre composite material comprises a polyurethane-based thermoset matrix and fibres embedded therein, characterized in that the hybrid component part has been produced by a process according to claim 1.

17. Process for producing a hybrid component part comprising the steps of:
a) providing a reactive composition at least comprising:
at least one hardener which is a uretdione having an NCO functionality of at least two,
at least one binder which is a polyol compound having an OH functionality of 3 to 6 and which comprises at least one polar functional group selected from an ester, carbonate, amide, urethane, urea, thioester or thiocarbonate functionality;
b) providing fibres;
c) coating the fibres with the reactive composition;
d) exposing at least the reactive composition to heat to perform a first crosslinking reaction in the course of which hardener and binder are converted into a thermoplastic polymer, thus embedding the fibres into the thermoplastic polymer;
e) providing a metallic main body or a semifinished precursor thereof;
f) placing the thermoplastic polymer comprising the fibres embedded therein onto a localized area of the main body/semifinished precursor thereof;
g) pressing the thermoplastic polymer onto the main body/semifinished precursor thereof so that the fibres adhere to the main body/semifinished precursor thereof via the thermoplastic polymer;
h) forming the semifinished precursor comprising the thermoplastic polymer adherent thereto to afford the metallic main body provided that only a semifinished precursor of the main body was provided in step e);
i) exposing at least the thermoplastic polymer to heat to perform a second crosslinking reaction in the course of which the thermoplastic polymer is converted to a thermoset polymer;
k) obtaining the hybrid component part comprising at least the metallic main body provided with at least one local stiffening composed of a fibre composite material, wherein the fibre composite material comprises a matrix formed from the thermoset polymer and the fibres embedded therein, wherein the thermoplastic polymer comprising the fibres embedded therein is provided in layerwise fashion and in that the sequence of steps f) and g) is accordingly carried out repeatedly to place and press on in layerwise fashion the thermoplastic polymer comprising the fibres embedded therein.

18. Process according to claim 17, characterized in that the second crosslinking reaction is performed at a temperature between 160° C. and 220° C.

19. Process according to claim 18, characterized in that the main body is composed of a steel which in the course of performance of the second crosslinking reaction undergoes a change and/or rearrangement of its microstructure.

20. Process according to claim 17, characterized in that the placing and/or the pressing of the thermoplastic polymer onto the main body/the semifinished precursor thereof is effected at a temperature of 20° C. to 25° C.

21. Process according to claim 18 with the proviso that a semifinished precursor of the main body is provided and formed into the main body with adherent thermoplastic polymer, characterized in that the forming of the semifinished precursor into the main body is effected at a temperature of 20° C. to 150° C., if necessary after heating of the semifinished precursor and/or by using a heated forming apparatus.

22. Process according to claim 17, characterized in that the first crosslinking reaction is performed in the absence of the metallic main body/the semifinished precursor thereof.

23. Process according to claim 22, characterized in that after performance of the first crosslinking reaction a period of one day to one year elapses before the second crosslinking reaction is performed and in that the thermoplastic polymer comprising the fibres embedded therein is stored and/or transported at temperatures between 15° C. and 30° C. over this period.

24. Process according to claim 17, characterized in that as hardener uretdiones free from blocking agents are employed which are produced from at least one of the following substances:
   isophorone diisocyanate (IPDI), hexamethylene diisocyanate (HDI), diisocyanatodicyclohexylmethane (H12MDI), 2-methylpentane diisocyanate (MPDI), mixtures of 2,2,4-trimethylhexamethylene diisocyanate and 2,4,4-trimethylhexamethylene diisocyanate (TMDI), and norbornane diisocyanate (NBDI).

25. Process according to claim 17, characterized in that at least one polycaprolactone is employed as binder.

26. Process according to claim 17, characterized in that as binder at least one polyester polyol is employed which has an OH number between 20 mg KOH/g and 500 mg KOH/g, an acid number of not more than 2 mg KOH/g and a molar mass between 100 g/mol and 5000 g/mol.

27. Process according to claim 17, characterized in that the composition comprises at least one cobinder, wherein as cobinder epoxy resins are employed which are selected from the group comprising epoxy resins based on bisphenol A diglycidyl ether, epoxy resins based on bisphenol F diglycidyl ether and cycloaliphatic types, for example 3,4-epoxycyclohexylepoxyethane or 3,4-epoxycyclohexylmethyl-3,4-epoxycyclohexanecarboxylate.

28. Process according to claim 27, characterized in that the composition comprises a hardener corresponding to the cobinder which is selected from the group comprising the following substance classes: polycarboxylic acid, polycarboxylic anhydride, aliphatic polyamines, cycloaliphatic polyamines, polyetheramines, polymercaptans or polyamidoamines.

29. Process according to claim 17, characterized in that the composition is free from substances that exhibit catalytic activity for the first and/or second crosslinking reaction.

30. Process according to claim 17, characterized in that the composition is provided in a liquid solvent, wherein the constituents of the composition are dissolved and/or suspended and/or dispersed in the solvent so that the coating of the fibres with the composition is effected by impregnating the fibres with the solvent and in that the constituents dissolved/suspended/dispersed therein, and in that the solvent is at least partly evaporated from the fibres in the course of performance of the first crosslinking reaction, wherein the solvent is an ester or a ketone or a mixture comprising at least one ester and/or at least one ketone.

31. Process according to claim 17, characterized in that the thermoplastic polymer comprising the fibres embedded therein is placed at the localized region of the main body/the semifinished precursor thereof without the use of an additional adhesive.

32. Hybrid component part comprising a metallic main body provided with at least one local stiffening made of a fibre composite material, wherein the fibre composite material comprises a polyurethane-based thermoset matrix and fibres embedded therein, characterized in that the hybrid component part has been produced by a process according to claim 17.

* * * * *